July 29, 1958

L. SAIVES 2,844,974

POWER-TRANSMISSIONS IN PARTICULAR FOR MOTOR VEHICLES

Filed May 4, 1953

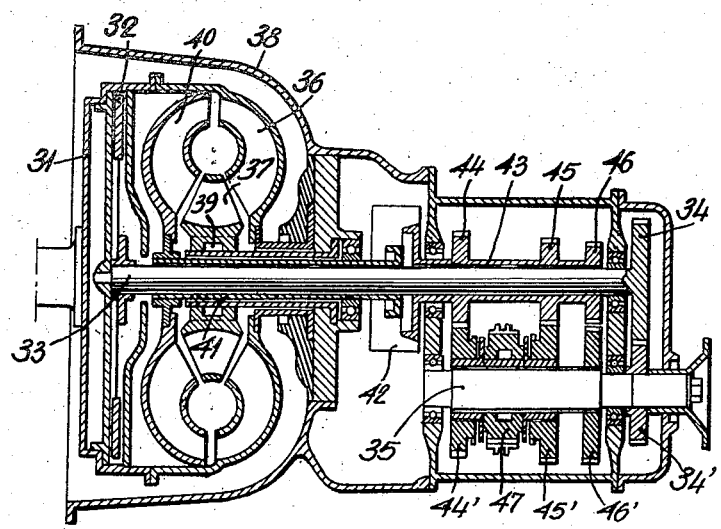
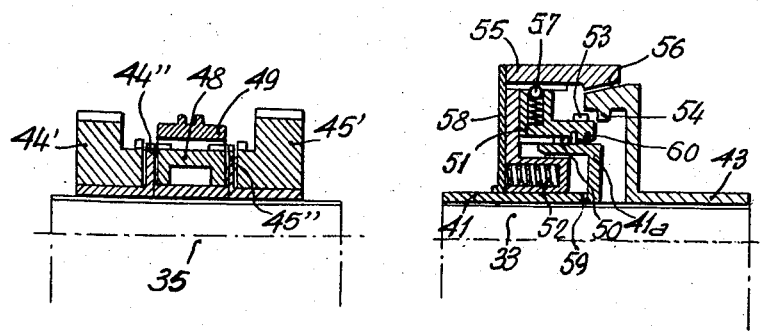

United States Patent Office 2,844,974
Patented July 29, 1958

2,844,974

POWER-TRANSMISSIONS IN PARTICULAR FOR MOTOR VEHICLES

Leon Saives, Billancourt, France, assignor to Regie Nationale des Usines Renault, Billancourt, France Application May 4, 1953, Serial No. 352,723

Claims priority, application France May 17, 1952

4 Claims. (Cl. 74—720)

This invention relates to transmission mechanisms particularly for motor vehicles, in which the driven or output shaft is not co-axial with the driving or input shaft. In such transmissions, the driven shaft is generally parallel to the driving shaft, the output of motion taking place either at one end of it, or at the other, or at both.

Transmissions of this type comprise a normal running arrangement, provided for use when the vehicle is running at normal driving speeds, on the level or on a gentle slope, in which according to a well-known arrangement, the power of the engine is transmitted, by means of a friction clutch, to a clutch shaft co-axial with the driving shaft and carrying one of the two pinions of a pair of gear-wheels, the other pinion of which is rigidly secured to the driven shaft, which is parallel to the first.

The present invention is characterized by the fact that the whole assembly of the usual gear arrangements which are geared down more than the normal running arrangement, and which are intended for use at low speed and when it is desired to give the vehicle greater acceleration or to make it climb, a steeper gradient than it is possible or wise to do with the normal running arrangement is replaced by a single pair of pinions, giving a lower gear ratio than that of the normal running arrangement, the first pinion of this pair, which is concentric with the clutch-shaft, receiving the motion from the engine by means of a hydraulic torque converter of known type acting as a torque converter or as a fluid clutch according to the working conditions and the torque of the driving shaft and the driven shaft, and the second pinion being concentric with the driven shaft; one or other of these two pinions is connected to the shaft on which it is mounted by a unidirectional coupling or free-wheel, which only allows the power to be transmitted in the direction of rotation of the engine.

The object of this arrangement is, while reducing the number of necessary gears to the minimum, to benefit from the advantages of flexibility inherent in the torque converter under all running conditions where gearing down is necessary, and to avoid the disadvantages of these same mechanisms, namely a loss of output which reduces the speed and increases the fuel consumption, under normal running conditions.

It has been found that in certain cases it might be an advantage to be able to gear down the torque-converter transmission. The advantage of different gearing down ratios, for running with a converter, appears when a power curve of the engine and the weight of the vehicle are such that, in order to obtain the required performances, particularly in mountainous country, a greater stepping down of the gears is found necessary than that permitted by the transmission with two gear ratios, one of which is for running with a torque converter and the other for running without a converter.

On the other hand, it is also advantageous for the whole assembly of the mechanism for selecting the gear ratio when running with a torque converter and when changing over from forward to reverse drive, to be housed actually inside the gear box, thus avoiding the necessity of providing an external gear-changing device as indicated above.

The invention also provides a torque-converter transmission arrangement which meets different requirements.

In order to operate the selection, by engagement of a dog-clutch or by engaging teeth, in a gear box combined with a hydraulic torque converter, it is necessary to add to the mechanism a coupling device capable of interrupting the transmission of the residual torque which is exerted on the output shaft of the converter when the engine is turning slowly, and which would not permit the engagement of the dogs or teeth of the pinions without a shock nor their disengagement without exceptional effort. Moreover, such a coupling should permit the smooth restoration of the transmission of the residual torque when the engine is turning slowly, and it should be capable, once it is coupled, of transmitting the maximum torque from the engine, multiplied by the converter.

Designs are known in which a coupling of this type has been obtained by means of a conventional type friction clutch, arranged in front of or behind a torque converter, or a hydraulic torque converter, with a view to combining them with a conventional gear-box having a selector-rod.

In the present invention, this coupling, between the torque converter and the gear box, is constituted by a dog-clutch mounted on the output shaft of the converter, which is made in two parts; when running, this dog-clutch is kept engaged by springs, and it can be disengaged, even when it is subjected to the residual torque from the converter, while the engine is turning slowly, by the action of a fluid under pressure acting on a suitably arranged piston, thus ensuring the interruption of the transmission which is necessary at the time of disengaging and engaging of the teeth in the gear-box.

Moreover, this coupling includes a synchronisation device which comes into operation when the action of the fluid under pressure ceases and which is constructed in such a manner as to be able to brake the entire residual torque from the converter when the engine is turning slowly, in order to ensure a smooth re-engaging of the main dog-clutch.

Finally, there is also provided a unidirectional dog-clutch device for the selection of one of the sets of driving pinions by the torque converter so that, when the dog-clutch is slid further than necessary to bring it in mesh with the pinion, this unidirectional coupling is locked in such a manner as to permit the engine to be used as a brake or to start it while the vehicle is moved forward.

The invention will now be described with reference, by way of example, to the accompanying drawing in which:

Figure 3 is a general diagrammatical view of a gear box providing two reduction-gear ratios and reverse gear incorporated according to the invention;

Figure 4 is a detailed view of the unidirectional coupling and of the dog-clutches of the gear-box as shown in Figure 3;

Figure 5 is a detailed view of the main coupling, in the uncoupled position, as shown in Figure 3.

Figure 1 illustrates the conventional arrangement of the transmission of power between a driving shaft 1 and a driven shaft 2 parallel to the first but not co-axial therewith, in the highest gear position.

Figure 1:
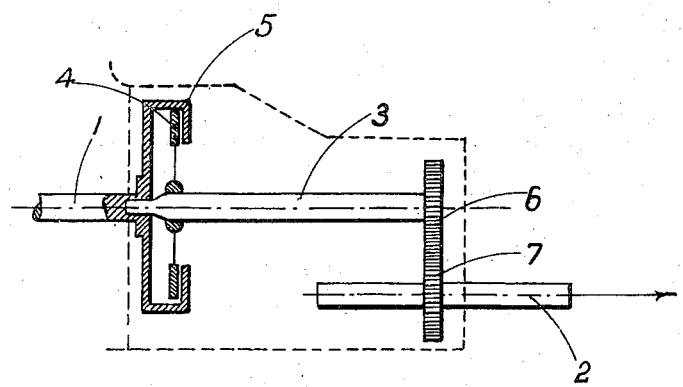
Figure 1 is a diagrammatical view of the only part of the conventional arrangement of the transmission of power between the driving shaft and the driven shaft, which is retained in the transmission according to the invention.

This transmission comprises a clutch, of which one part 5 is rigidly secured to the shaft 1, and the other part 4 consists of a disc rigidly secured to the clutch-shaft 3, and a pair of pinions 6, 7, each mounted respectively on the clutch-shaft and the driven shaft; the transmission also comprises sets of pinions and other members (not illustrated) for driving the shaft 2 at a speed lower than that supplied by means of the first pair of pinions.

According to the invention, the assembly of the other members intended to provide speeds of rotation of the driven shaft lower than the speed of normal running is replaced by a torque converter connected to a second pair of pinions, carried respectively on the clutch-shaft and the driven shaft, one of them being preferably mounted by means of a free wheel.

Figure 2:
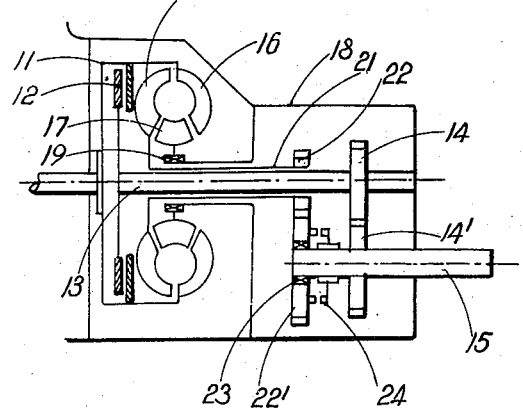
Figure 2 is a diagrammatical view of a transmission according to the invention.

The general arrangement of the invention is illustrated on Figure 2, in which 11 is the flywheel, 12 the disc of the friction clutch driving the driven shaft 15 through the clutch shaft 13 and the pair of gears for normal running 14 and 14'.

The torque converter has its pump member 16 driven by the flywheel, its reaction member 17 connected to the casing 1 by means of the unidirectional brake 19 which only allows the reaction member to rotate freely in the same direction as the engine, and its driven member 20 connected to the pair of pinion gears 22 and 22' by means of the tubular shaft 21, concentric with the clutch shaft 13.

The pinion 22' is connected to the driven shaft 15 by means of the unidirectional coupling 23, arranged in such a manner that the shaft 15 is free to turn more quickly but cannot turn less quickly than the pinion 22'.

An optional locking device 24 enables the pinion 22' and the shaft 15 to be locked together for both directions of rotation.

The transmission thus described is completed, between the shaft 13 and the driving wheels of the vehicle, by a direction changing device (not illustrated) making it possible to obtain forward or reverse drive or neutral.

So long as the running conditions of the vehicle are such that a low gear is desirable, that is to say at low speeds, on hills, and to obtain rapid acceleration, the clutch 12 is kept disengaged, the transmission of the motion of the flywheel 11 to the driven shaft 15 takes place by means of the torque converter 16, 17, 20, the shaft 21, the pair of gears 22, 22', and the unidirectional coupling 23.

When normal running conditions obtain, in which a higher gear and a more economical drive are desirable, the clutch 12 is engaged, by means which may be mechanical, electrical or hydraulic. The transmission of the motion from the flywheel 11 to the driven shaft 15 then takes place through the clutch 12, the clutch shaft 13 and the pair of gears 14 and 14'. In these circumstances, the torque converter acts as a fluid clutch and continues to drive the pinion 22' through the shaft 21 and the pinion 22, but as the speed of rotation of the shaft 15 is then greater than that of the pinion 22', the unidirectional coupling 23 is in the position of a free wheel and no power is transmitted by the assembly of the low geared arrangement of the transmission.

In an improved form of the invention, the operation of the clutch 12 may be made automatic and be governed by a governor which, in accordance with a known principle, causes the clutching and de-clutching in accordance with a pre-determined rule as a function of the operating speed of the driven shaft 15 and of the couple delivered by the engine. This governor acts as the required amount on the clutch by the mechanical, hydraulic or electric means which control it.

If desired, the transmission may also comprise a locking device 24, which can be operated at the will of the driver, locking the pinion 22' and the shaft 15 in both directions of rotation, and enabling the engine either to be used as a brake when going downhill in low gear, or to be started, in the same gear, by using the forward movement of the vehicle by inertia, gravity or towing.

Figure 3 shows one form of construction in which the torque converter drive is geared down.

In Figure 3, 31 is a flywheel, 32 the disc of the friction clutch driving the driven shaft 35 through the clutch shaft 33 and the pair of gears 34 and 34' for normal running.

The torque converter has its pump member 36 driven by the flywheel, its reaction member 37 connected to the casing 38 by a unidirectional brake 39, which only allows the reaction member to rotate freely in the same direction as the engine, and its driven member 40, connected by means of the tubular shaft 41 concentric with the clutch shaft 33, to the driving side of the main coupling 42, illustrated in greater detail in Figure 5.

The output shaft 43 of the main coupling carries the driving pinions 44 and 45 of the two pairs of gears giving different gear ratios for running with the torque converter, the driven pinions 44' and 45' of which are mounted loose on the driven shaft 35. The output shaft 43 of the main coupling also carries the driving pinion 46 for reverse drive. The driven shaft 35 of the gear box carries, between the driven pinions 44' and 45', which are mounted loosely thereon, a unidirectional coupling 47, the outer ring 48 of which (Figure 4) carries, in turn, by means of keyways, the dog-clutch sleeve 49 which, by sliding longitudinally at the will of the driver, can be engaged either with the pinion 44' or with the pinion 45' (Figure 4).

If it is slid further, the dog-clutch sleeve 49 can be engaged with one or other of the toothed rings 44" and 45", driven with the driven shaft 35, thus depriving the unidirectional coupling 49 of all liberty and thus enabling the engine to be used as a brake or started by moving the vehicle forward.

The driven shaft also carries the driven pinion 46' for reverse drive. An intermediate pinion for reverse drive (not illustrated), mounted loosely and sliding on a third shaft parallel to the first two, can be brought into mesh simultaneously with the two pinions 46 and 46'.

When the dog clutch sleeve 49 is in mesh with one or other of the driven pinions 44' or 45', the operation of the transmission is identical with that described with reference to Figures 1 and 2.

In Figure 5, the driving member 41a is rigidly secured to the shaft 41 of the driven member 40 of the torque converter. It carries a sliding device 50 capable of causing the rotation of a piston 51 which is free to slide on the shaft but is permanently urged towards the right by a series of springs 52.

The piston 51 is provided, on the one hand, with teeth 53 which, when it is displaced towards the right of the figure by means of the springs, come into mesh with corresponding teeth carried by the output plate 54, mounted on the output shaft 43, and on the other hand with a synchronising sleeve 55 rigidly secured for rotation with the piston but slidable thereon, and which, when it is displaced towards the right, comes into contact with its tapered part 56 with a corresponding tapered part carried by the output plate 54.

The piston 51 and the synchronising sleeve 55 are also connected to one another by a locking system comprising balls 57 or any other known equivalent system, preventing the sleeve from sliding on the piston as long as the axial effort between these two parts does not exceed a certain predetermined value. When the piston is displaced towards the left, a thrust-plate 58 ensures the return of the sleeve to the engaging position for the locking device just mentioned.

The coupling operates as follows:

During normal running, the teeth 53 are in mesh with teeth 54 and the input and output shafts are rigidly secured together. In order to disengage the coupling, an operation which is carried out when it is desired to engage or disengage the dogs or teeth of the gear box, a fluid under pressure, such as oil, is delivered to the right-hand face of the piston 51, through the ducts 59, and, being trapped between the driving member 41a and the piston 51, due to the sealed joint 60, displaces the piston towards the left against the action of the springs 52, and disengages the teeth 53.

In order to effect the re-engagement of the coupling, the pressure of the fluid between the driving member 41 and the piston 51 is reduced. Under the action of the springs 52, the piston 51 carrying the synchronising sleeve 55 returns towards the right. In the first instance, the tapered edges of the synchronising sleeve 55 and of the output plate 54 come into contact and ensure the synchronisation of the corresponding parts in spite of the residual torque from the converter which acts on the driving member 41. Secondly, the pressure of the springs compels the ball 57 to leave its seating and thus releases the piston 51 from the sleeve 55; the teeth 53 then come into mesh and the coupling is in the position for normal running.

I claim:

1. A transmission mechanism for an engine-driven vehicle comprising, in combination, a casing, a driving shaft, a hydraulic converter having an impeller element rigidly connected with said driving shaft, a reaction element in said converter, a one-way brake connecting said reaction element with said casing, a turbine element in said converter, a first shaft portion coaxial with the driving shaft and rigidly connected to the turbine element, a second shaft portion co-linear with said first shaft portion and driven thereby, two pinions carried by said second shaft portion, a driven shaft parallel to the driving shaft, two driven pinions carried by said driven shaft loosely mounted thereon and in constant meshing relationship with the pinions carried by the second shaft portion, said four pinions providing two reduced transmission ratios, a unidirectional coupling having an outer member and an inner-member carried by said driven shaft between said pinions, an externally-operated slidable sleeve for selectively connecting each of said pinions on the driven shaft to said outer member, a primary shaft coaxial with the driving shaft, a friction clutch for connecting said driving shaft with said primary shaft, a pinion carried by said primary shaft, a second pinion carried by said driven shaft in constant meshing engagement with the pinion on the primary shaft, said two last-named pinions providing the maximum transmission ratio of the mechanism.

2. A transmission mechanism as defined in claim 1, wherein said slidable sleeve is slidable axially in both directions from a central neutral position, the first part of the movement of said sleeve in each direction engaging it with one of the pinions on the driven shaft, and a further movement engaging it with a toothed ring connected with said driven shaft, thereby locking the unidirectional coupling and permitting the use of the engine as a brake and the starting of said engine by forward motion of the vehicle.

3. A transmission mechanism as defined in claim 1, wherein a coupling interconnects said two shaft portions, said coupling comprising a friction driving member adapted to transmit the torque of the converter while the engine idles and a dog clutch member adapted to absorb the maximum output torque of the converter, springs for placing said members successively and automatically into operative connection, and means for confining a fluid under pressure to disengage said members.

4. A transmission mechanism as defined in claim 1, wherein one of said shaft portions carries an annular piston axially slidable thereon and supporting a toothed ring, and the other of said shaft portions carries a complementary toothed ring, springs urging said piston and its toothed ring in the direction of the complementary toothed ring so that said rings are normally engaged to provide a connection between said shaft portions, means defining an annular chamber in said piston and an inlet for introducing fluid under pressure into said chamber for disengaging said toothed rings, a synchronization sleeve surrounding said annular piston and provided with an inner conical surface at one end, elastic engaging means connecting said sleeve with said piston, said second-named toothed ring having an external conical surface complementary to that on the sleeve for frictional engagement therewith.

References Cited in the file of this patent
UNITED STATES PATENTS

| | | |
|---|---|---|
| 2,260,581 | Pollard | Oct. 28, 1941 |
| 2,351,553 | Simpson | June 13, 1944 |
| 2,355,709 | Dodge | Aug. 15, 1944 |
| 2,440,588 | Kegresse | Apr. 27, 1948 |
| 2,511,039 | Black | June 13, 1950 |
| 2,567,446 | Polomski | Sept. 11, 1951 |
| 2,600,269 | Saives | June 10, 1952 |